(12) United States Patent
Lord et al.

(10) Patent No.: US 10,301,971 B2
(45) Date of Patent: *May 28, 2019

(54) LOW PRESSURE RATIO FAN ENGINE HAVING A DIMENSIONAL RELATIONSHIP BETWEEN INLET AND FAN SIZE

(71) Applicant: United Technologies Corporation, Farmington, CT (US)

(72) Inventors: Wesley K. Lord, South Glastonbury, CT (US); Robert E. Malecki, Storrs, CT (US); Yuan J. Qiu, Glastonbury, CT (US); Becky E. Rose, Colchester, CT (US); Jonathan Gilson, W. Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,136

(22) Filed: Feb. 2, 2018

(65) Prior Publication Data
US 2018/0163568 A1    Jun. 14, 2018

Related U.S. Application Data

(63) Continuation of application No. 13/721,095, filed on Dec. 20, 2012, now Pat. No. 9,920,653.

(51) Int. Cl.
*F01D 1/02* (2006.01)
*F01D 25/24* (2006.01)
(Continued)

(52) U.S. Cl.
CPC .............. *F01D 25/24* (2013.01); *F01D 5/02* (2013.01); *F01D 5/141* (2013.01); *F01D 15/12* (2013.01);
(Continued)

(58) Field of Classification Search
None
See application file for complete search history.

(56) References Cited

U.S. PATENT DOCUMENTS

| 2,258,792 A | 4/1941 | New |
| 2,936,655 A | 5/1960 | Peterson et al. |

(Continued)

FOREIGN PATENT DOCUMENTS

| EP | 0791383 | 8/1997 |
| EP | 1142850 | 10/2001 |

(Continued)

OTHER PUBLICATIONS

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
(Continued)

*Primary Examiner* — Woody A Lee, Jr.
*Assistant Examiner* — Jason A Fountain
(74) *Attorney, Agent, or Firm* — Carlson, Gaskey & Olds, P.C.

(57) ABSTRACT

According to an example embodiment, a gas turbine engine assembly includes, among other things, a fan section including a fan, the fan including a plurality of fan blades, a diameter of the fan having a dimension D that is based on a dimension of the fan blades, each fan blade having a leading edge, and a forward most portion on the leading edges of the fan blades in a first reference plane, a geared architecture, a turbine section including a high pressure turbine and a low pressure turbine, the low pressure turbine driving the fan through the geared architecture, a nacelle surrounding the fan, the nacelle including an inlet portion forward of the fan, a forward edge on the inlet portion in a second reference plane, and a length of the inlet portion having a dimension
(Continued)

L measured along an engine axis between the first reference plane and the second reference plane. A dimensional relationship of L/D is no more than 0.45.

30 Claims, 2 Drawing Sheets

(51) Int. Cl.
| | |
|---|---|
| F02K 3/06 | (2006.01) |
| F01D 5/14 | (2006.01) |
| F02C 7/04 | (2006.01) |
| F01D 5/02 | (2006.01) |
| F01D 15/12 | (2006.01) |
| F01D 17/10 | (2006.01) |

(52) U.S. Cl.
CPC .............. *F01D 17/105* (2013.01); *F02C 7/04* (2013.01); *F02K 3/06* (2013.01); *F05D 2220/32* (2013.01); *F05D 2250/00* (2013.01); *F05D 2260/40311* (2013.01); *F05D 2260/96* (2013.01); *Y02T 50/671* (2013.01); *Y02T 50/673* (2013.01)

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,494,129 A | 2/1970 | Krebs et al. | |
| 3,532,129 A | 10/1970 | Morris et al. | |
| 3,546,882 A | 12/1970 | Berkey | |
| 3,747,343 A | 7/1973 | Rosen | |
| 3,754,484 A | 8/1973 | Roberts | |
| 3,820,719 A | 6/1974 | Clark | |
| 3,843,277 A | 10/1974 | Ehrich | |
| 3,892,358 A | 7/1975 | Gisslen | |
| 3,932,058 A | 1/1976 | Harner et al. | |
| 3,935,558 A | 1/1976 | Miller et al. | |
| 3,946,830 A | 3/1976 | Kutney et al. | |
| 3,988,889 A | 11/1976 | Chamay et al. | |
| 4,130,872 A | 12/1978 | Harloff | |
| 4,209,149 A | 6/1980 | Morris et al. | |
| 4,240,250 A | 12/1980 | Harris | |
| 4,284,174 A | 8/1981 | Salvana et al. | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,827,712 A | 5/1989 | Coplin | |
| 4,927,328 A | 5/1990 | Scoates et al. | |
| 4,934,139 A | 6/1990 | Newton et al. | |
| 4,979,362 A | 12/1990 | Vershure, Jr. | |
| 5,058,617 A | 10/1991 | Stockman et al. | |
| 5,102,379 A | 4/1992 | Pagluica et al. | |
| 5,141,400 A | 8/1992 | Murphy et al. | |
| 5,317,877 A | 6/1994 | Stuart | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,642,985 A | 7/1997 | Spear et al. | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,403 A * | 6/1999 | McConachie | B64D 33/02 |
| | | | 137/15.1 |
| 5,915,917 A | 6/1999 | Eveker et al. | |
| 5,966,525 A | 10/1999 | Manzi, Jr. et al. | |
| 5,975,841 A | 11/1999 | Lindemuth et al. | |
| 5,985,470 A | 11/1999 | Spitsberg et al. | |
| 6,071,077 A | 6/2000 | Rowlands | |
| 6,158,210 A * | 12/2000 | Orlando | F02C 3/067 |
| | | | 29/889.2 |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,708,711 B2 | 3/2004 | Surply et al. | |
| 6,709,492 B1 | 3/2004 | Spadaccini et al. | |
| 6,814,541 B2 | 11/2004 | Evans et al. | |
| 6,973,193 B1 | 12/2005 | Tse et al. | |
| 7,021,042 B2 | 4/2006 | Law | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,632,064 B2 * | 12/2009 | Somanath | F01D 5/148 |
| | | | 415/191 |
| 7,662,059 B2 | 2/2010 | McCune | |
| 7,797,944 B2 | 9/2010 | Morford et al. | |
| 7,806,651 B2 | 10/2010 | Kennepohl et al. | |
| 7,824,305 B2 | 11/2010 | Duong et al. | |
| 7,882,694 B2 | 2/2011 | Suciu et al. | |
| 7,926,260 B2 | 4/2011 | Sheridan et al. | |
| 7,997,868 B1 | 8/2011 | Liang et al. | |
| 8,205,432 B2 | 6/2012 | Sheridan | |
| 8,402,739 B2 | 3/2013 | Jain et al. | |
| 8,418,953 B2 | 4/2013 | Smith et al. | |
| 8,449,247 B1 | 5/2013 | Hasel et al. | |
| 8,601,786 B2 * | 12/2013 | Hurwitz | F01D 17/08 |
| | | | 60/226.3 |
| 8,650,854 B2 * | 2/2014 | Migliaro, Jr. | F02K 1/15 |
| | | | 60/226.1 |
| 8,726,632 B2 | 5/2014 | Morford et al. | |
| 9,920,653 B2 * | 3/2018 | Lord | F01D 25/24 |
| 9,932,933 B2 * | 4/2018 | Lord | F02K 3/068 |
| 2004/0238687 A1 | 12/2004 | Jones et al. | |
| 2005/0274103 A1 | 12/2005 | Prasad et al. | |
| 2008/0003096 A1 | 1/2008 | Kohli et al. | |
| 2008/0116009 A1 | 5/2008 | Sheridan et al. | |
| 2008/0317588 A1 | 12/2008 | Grabowski et al. | |
| 2009/0003997 A1 | 1/2009 | Jain et al. | |
| 2009/0056343 A1 | 3/2009 | Suciu et al. | |
| 2010/0105516 A1 | 4/2010 | Sheridan et al. | |
| 2010/0148396 A1 | 6/2010 | Xie et al. | |
| 2010/0162683 A1 | 7/2010 | Grabowski et al. | |
| 2010/0212281 A1 | 8/2010 | Sheridan | |
| 2010/0218483 A1 | 9/2010 | Smith | |
| 2010/0269512 A1 | 10/2010 | Morford et al. | |
| 2010/0331139 A1 | 12/2010 | McCune | |
| 2011/0159797 A1 | 6/2011 | Beltman et al. | |
| 2011/0293423 A1 | 12/2011 | Bunker et al. | |
| 2012/0124964 A1 | 5/2012 | Hasel et al. | |
| 2015/0044028 A1 | 2/2015 | Lord et al. | |
| 2016/0108854 A1 * | 4/2016 | Lord | F02K 3/06 |
| | | | 415/124.1 |

FOREIGN PATENT DOCUMENTS

| | | |
|---|---|---|
| EP | 0715066 B1 | 12/2001 |
| EP | 2259115 | 9/2003 |
| EP | 1607603 A2 | 12/2005 |
| GB | 1516041 | 6/1978 |
| GB | 2041090 | 9/1980 |
| GB | 2259115 | 3/1993 |
| GB | 2426792 | 12/2006 |
| WO | 0146944 A1 | 6/2001 |
| WO | 2007038674 | 4/2007 |
| WO | 2014100081 | 6/2014 |
| WO | 2014137685 | 9/2014 |

OTHER PUBLICATIONS

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan.

(56) References Cited

OTHER PUBLICATIONS

Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill pp. 87-151.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Rankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_pffe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E, Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.455D-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.

(56) References Cited

OTHER PUBLICATIONS

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 31 2001 pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A55, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMGs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Sod. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Krauskopf, L. (2014). GE exec say avoided geared design in jet engine battle with Pratt. Reuters. Retrieved Jan. 4, 2017 from: http://www.reuters.com/article/us-general-electric-united-tech-engine-idUSKBN0HA2H620140915.
The International Preliminary Report on Patentability for PCT Application No. PCT/US2014/056203, dated Apr. 14, 2016.
European Search Report for European Patent Application No. 13864565.0 completed Dec. 16, 2015.
The Extended European Search Report for EP Application No. 16193884.0, dated Mar. 7, 2017.
Graham-Rowe, D. (2010). More efficient jet engine gets in gear. MIT Technology Review. Dec. 13, 2010. Retrieved Mar. 13, 2017 from: https://www.technologyreview.com/s/421992/more-efficient-jet-engine-gets-in-gear/.
Whitaker, R. (1982). ALF 502: plugging the turbofan gap. Flight International, p. 237-241, Jan. 30, 1982.

(56) References Cited

OTHER PUBLICATIONS

Munt, R. (1981). Aircraft technology assessment: Progress in low emissions engine. Technical Report. May 1981. pp. 1-171.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to-5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). NASA Technical Paper. Nov. 1979. pp. 1-68.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Carney, K., Pereira, M. Revilock, and Matheny, P. (2003). Jet engine fan blade containment using two alternate geometries. 4th European LS-DYNA Users Conference. pp. 1-10.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case pp. 1-4.
Hall, C.A and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J.. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko—Progress D-436. Jane's Aero-engines, Aero-engines—Turbofan. Feb. 8, 2012.

(56) References Cited

OTHER PUBLICATIONS

Ivchenko—Progress AI-727M. Jane's Aero-engines, Aero-engines—Turbofan. Nov. 27, 2011.
Ivchenko—Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
EPO Official Letter for European Patent Application No. 13684565.0 dated Aug. 17, 2018.

* cited by examiner

LOW PRESSURE RATIO FAN ENGINE HAVING A DIMENSIONAL RELATIONSHIP BETWEEN INLET AND FAN SIZE

CROSS-REFERENCE TO RELATED APPLICATIONS

This application is a continuation of U.S. patent application Ser. No. 13/721,095, filed on Dec. 20, 2012.

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors and the turbine section includes low and high pressure turbines.

A nacelle surrounds the engine. An inlet section of the nacelle is that portion of the nacelle that is forward of the fan section of the engine. One function of the inlet is to reduce noise. A minimum length of the inlet is typically required for noise reduction with high bypass ratio engines.

While longer inlets tend to improve noise reduction, that feature does not come without cost. A longer inlet is associated with increased weight and external drag. Additionally, the airflow at the inlet during takeoff typically creates a bending moment that is proportional to the length of the inlet. Longer inlets, therefore, tend to introduce additional load on the engine structure under such conditions.

SUMMARY

According to an example embodiment, a gas turbine engine assembly includes, among other things, a fan that has a plurality of fan blades. A diameter of the fan has a dimension D that is based on a dimension of the fan blades. Each fan blade has a leading edge. An inlet portion is situated forward of the fan. A length of the inlet portion has a dimension L between a location of the leading edge of at least some of the fan blades and a forward edge of the inlet portion. A dimensional relationship of L/D is between about 0.2 and 0.45.

In a further non-limiting embodiment of the foregoing gas turbine engine assembly, the engine has a high bypass ratio and the fan is a low pressure ratio fan having a pressure ratio between about 1.20 and about 1.50 at its cruise design point. The low pressure ratio fan has reduced fan source noise compared to that of conventional turbofan engines, thus the requirement for inlet length and associated acoustic liner is reduced, while still maintaining acceptable noise characteristics.

In a further non-limiting embodiment of any of the foregoing gas turbine engine assemblies, a flange is at an intermediate axial location where a nacelle inlet attaches to a forward edge of a fan case. The dimension L includes the combined length of the nacelle inlet and that portion of the fan case that is forward of the fan blade leading edge.

In a further non-limiting embodiment of any of the foregoing gas turbine engine assemblies, the ratio of L/D is between about 0.25 and 0.45.

In a further non-limiting embodiment of any of the foregoing gas turbine engine assemblies, the dimensional relationship of L/D is about 0.35.

In a further non-limiting embodiment of any of the foregoing gas turbine engine assemblies, the dimension L is different at a plurality of locations on the inlet portion. A greatest value of L corresponds to a value of L/D that is at most 0.45. A smallest value of L corresponds to a value of L/D that is at least 0.20.

In a further non-limiting embodiment of any of the foregoing gas turbine engine assemblies, the dimension L varies. The dimensional relationship of L/D is based on an average value of L.

In a further non-limiting embodiment of any of the foregoing gas turbine engine assemblies, the dimension L varies between a top of the inlet portion and a bottom of the inlet portion. The dimensional relationship of L/D is based on a value of L near a midpoint between the top and the bottom of the inlet portion.

In a further non-limiting embodiment, the axial location of the leading edge of the fan blades varies from hub to tip. The dimensional relationship of L/D is based on a value of L defined to an axial that is the average of fan hub and fan tip axial locations.

In a further non-limiting embodiment of any of the foregoing gas turbine engine assemblies, the dimension L extends along a direction that is parallel to a central axis of the engine.

In a further non-limiting embodiment of any of the foregoing gas turbine engine assemblies, the engine has a central axis. The forward edge on the inlet portion is in a first reference plane. The leading edges on the fan blades are in a second reference plane. The dimension L is measured between a first location where the central axis intersects the first reference plane and a second location where the central axis intersects the second reference plane.

The various features and advantages of at least one disclosed example embodiment will become apparent to those skilled in the art from the following detailed description. The drawings that accompany the detailed description can be briefly described as follows.

DETAILED DESCRIPTION

Figure 1:
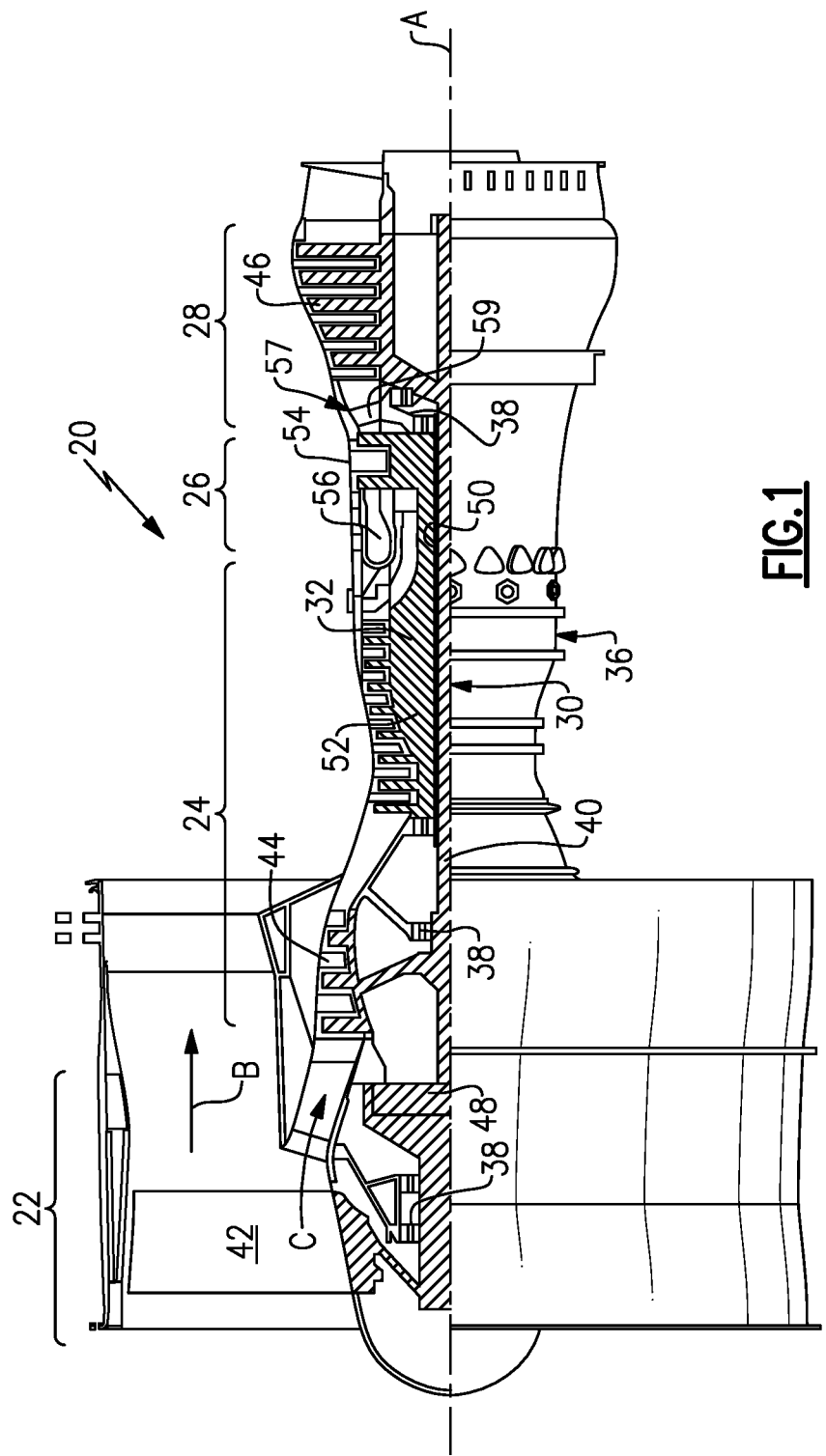
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

Figure 2:
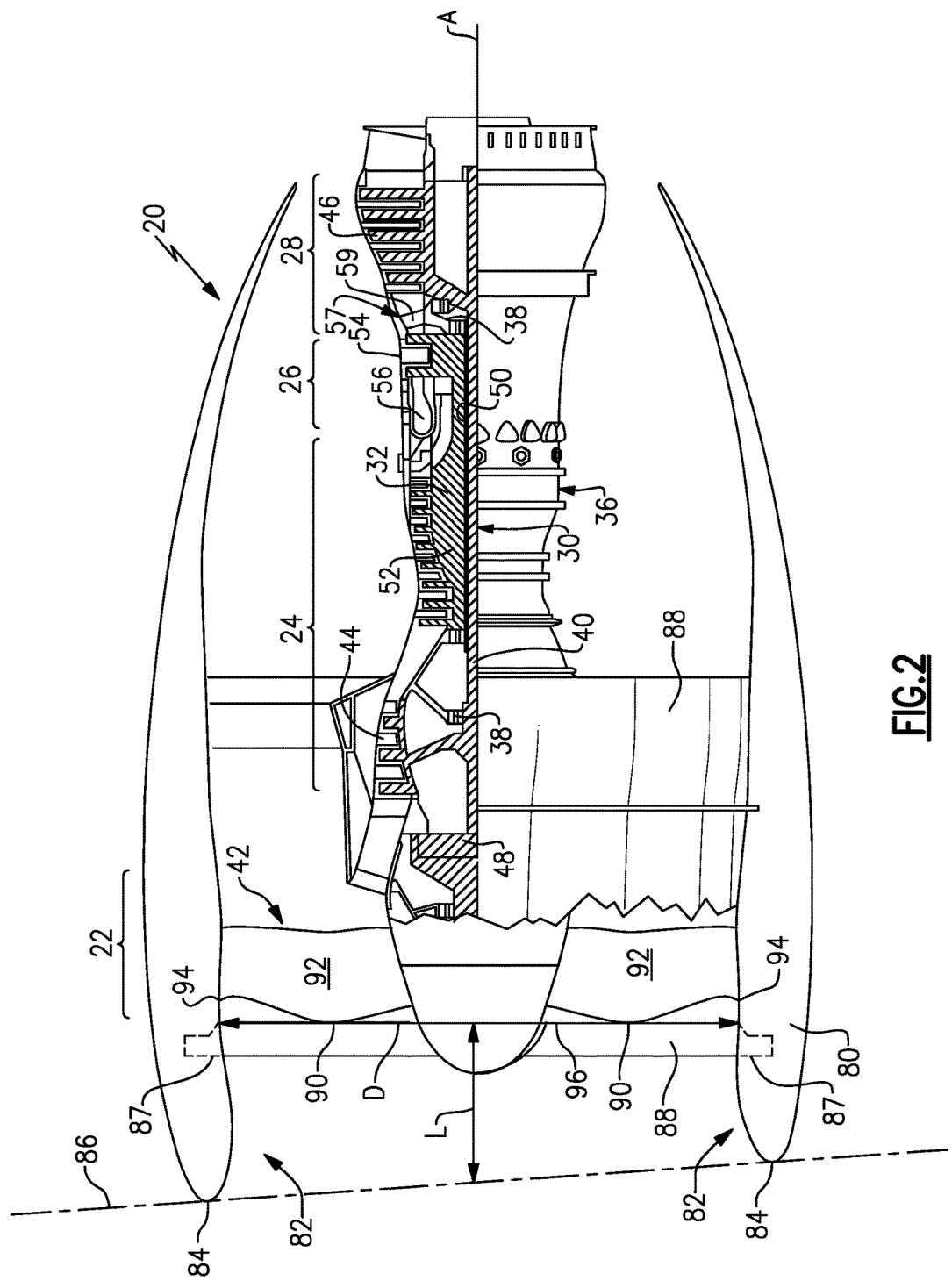
FIG. 2 schematically illustrates selected portions of the example gas turbine engine and demonstrates an example dimensional relationship designed according to an embodiment of this invention.

FIG. 2 illustrates an example embodiment of the engine 20 with a nacelle or cowling 80 that surrounds the entire engine. An inlet portion 82 is situated forward of the fan 42. In this example, the inlet portion 82 has a leading edge 84, which may be defined by the inlet side cut on the cowling 80. The leading edge 84 is generally within a first reference plane 86.

The nacelle 80 in some examples includes a flange 87 that is received against a leading edge on a fan case 88. The inlet portion 82 has a length L between a selected location corresponding to the leading edge 84, such as a location within the reference plane 86, and a forward most portion 90 on leading edges on the fan blades 92 of the fan 42. In this example, the length L may be considered an axial length of the inlet portion 82 because the length L is taken along a direction parallel to the central longitudinal axis A of the engine 20. In the illustrated example, the inlet section of the nacelle 80 and the section of the fan case 88 that is forward of the blades 92 collectively establish the overall effective length L. In other words, in this example the length L of the inlet portion 82 includes the length of the inlet section of the nacelle 80 and some of the fan case 88.

The fan blades 92 establish a diameter between circumferentially outermost edges 94. The fan diameter D is shown in FIG. 2 as a dimension extending between the edges 94 of two of the fan blades 92 that are parallel to each other and extending in opposite directions away from the central axis A. In the illustration, the forward most portions 90 on the fan blades 92 are within a second reference plane 96. In this example, the second reference plane 96 is oriented generally perpendicular to the central axis A of the engine 20. The first reference plane 86 in this example is oriented at an oblique angle relative to the second reference plane 96 and the central axis A. In the illustrated example the oblique angle of orientation of the first reference plane 86 is approximately 5°.

The length L is selected to establish a desired dimensional relationship between L and D. In some example embodiments, the dimensional relationship of L/D (e.g., the ratio of L/D) is between about 0.2 and 0.45. In some example embodiments, the dimensional relationship of L/D is between about 0.25 and 0.45. In some examples L/D is between about 0.30 and about 0.40. In some example embodiments, the dimensional relationship of L/D is about 0.35.

As can be appreciated from FIG. 2, the length L of the inlet portion 82 (i.e., the combined length of the nacelle inlet and the forward section of the fan case) is different at different locations along a perimeter of the fan case 80. The leading edge 84 is further from the second reference plane 96 near the top (according to the drawing) of the engine assembly than it is near the bottom (according to the drawing) of the engine assembly. The greatest length L in this example corresponds to a value for L/D that is no more than 0.45. The smallest length L in the illustrated example corresponds to a value for L/D that is at least 0.20. The value of L/D may vary between those two limits at different locations on the leading edge 84.

In one example where the leading edge 84 has a variable distance from the second reference plane 96, the dimensional relationship L/D is taken based upon a measurement of L that corresponds to an average measurement of the dimension between the leading edge 84 of the inlet portion 82 and the average location of the leading edge on the fan blades 92. Stated another way, L/D in such an embodiment is based on a measurement of the average distance between the reference planes 86 and 96. In another example where the dimension between the first reference plane 86 and the second reference plane 96 varies, the dimension L used for the dimensional relationship L/D is taken at a midpoint between a portion of the leading edge 84 that is most forward and another portion of the leading edge 84 that is most aft.

In another example, the dimension L is measured between a first location where the central longitudinal axis A of the engine intersects the first reference plane 86 and a second location where the axis A intersects the second reference plane 96.

The dimensional relationship of L/D is smaller than that found on typical gas turbine engines. The corresponding dimensional relationship on most gas turbine engines is greater than 0.5. Providing a shorter inlet portion length L facilitates reducing the weight of the engine assembly. A shorter inlet portion length also reduces the overall length of the nacelle and reduces external drag. Additionally, having a shorter inlet portion 82 reduces the bending moment and corresponding load on the engine structure during flight conditions, such as takeoff. A shorter inlet portion 82 also can contribute to providing more clearance with respect to cargo doors and other mechanical components in the vicinity of the engine.

The example engine 20 is a high bypass ratio engine having a larger fan with respect to the engine core components and lower exhaust stream velocities compared to engines with lower bypass ratios. Higher bypass ratio engines tend to have fan noise as a more significant source of noise compared to other sources. The illustrated example includes a shorter inlet yet does not have an associated effective perceived noise level that is noticeably greater than other configurations with longer inlets. One reason for this is that the example engine 20 includes a low pressure ratio fan that operates at a slower fan speed, which is associated with less fan noise. In one example, the fan 42 has a pressure ratio between about 1.20 and about 1.50. A pressure ratio within that range corresponds to the engine operating at a cruise design point in some example implementations. The shorter length L of the inlet portion 82 combined with the low pressure ratio of the fan 42, which has a slower fan speed enabled by the geared architecture of the engine 20, results in an acceptable perceived engine noise level.

Utilizing a dimensional relationship as described above allows for realizing a relatively shorter inlet on a gas turbine engine while maintaining sufficient noise attenuation control. Additionally, the short inlet portion 82 combined with the low pressure ratio fan 42 provides improved propulsive efficiency and lower installed fuel burn compared to conventional gas turbine engine propulsion systems.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine assembly, comprising:
   a fan section including a fan, the fan including a plurality of fan blades, a diameter of the fan having a dimension D that is based on a dimension of the fan blades, each fan blade having a leading edge, and a forward most portion on the leading edges of the fan blades in a first reference plane;
   a geared architecture;
   a turbine section including a high pressure turbine and a low pressure turbine, the low pressure turbine driving the fan through the geared architecture;
   a nacelle surrounding the fan, the nacelle including an inlet portion forward of the fan, a forward edge on the inlet portion in a second reference plane, and a length of the inlet portion having a dimension L measured along an engine axis between the first reference plane and the second reference plane;
   wherein the fan delivers a portion of air into a compressor section and a portion of air into a bypass duct, and a bypass ratio of greater than 10, the bypass ratio being a ratio of a volume of air passing to the bypass duct compared to a volume of air passing into the compressor section;
   wherein the fan has a pressure ratio between 1.20 and 1.50 at a cruise design point;
   wherein a dimensional relationship of L/D is no more than 0.45; and
   wherein the low pressure turbine includes an inlet, an outlet, and a pressure ratio of greater than 5:1.

2. The assembly of claim 1, wherein the geared architecture defines a gear reduction ratio of greater than 2.3.

3. The assembly of claim 2, wherein the dimensional relationship of L/D is between 0.2 and 0.45.

4. The assembly of claim 3, wherein the high pressure turbine includes two stages.

5. The assembly of claim 4, wherein the dimensional relationship of L/D is no less than 0.30.

6. The assembly of claim 5, further comprising:
   an inner shaft concentric with an outer shaft;

wherein the inner shaft connects the fan and a low pressure compressor to the low pressure turbine such that the inner shaft drives the fan through the geared architecture; and wherein the outer shaft interconnects a high pressure compressor to the high pressure turbine.

7. The assembly of claim 6, wherein the pressure ratio of the fan is less than 1.45 at the cruise design point.

8. The assembly of claim 6, wherein the fan has a low corrected fan tip speed of less than 1150 ft/second.

9. The assembly of claim 8, wherein the dimensional relationship of L/D is between 0.30 and 0.40.

10. The assembly of claim 8, wherein the turbine section includes a mid-turbine frame between the high pressure turbine and the low pressure turbine.

11. The assembly of claim 10, wherein the mid-turbine frame includes a plurality of vanes in a core airflow path defined by the turbine section.

12. The assembly of claim 11, wherein the plurality of vanes are inlet guide vanes.

13. The assembly of claim 12, wherein the inlet guide vanes set airflow entering the low pressure turbine during operation.

14. The assembly of claim 13, wherein the dimensional relationship of L/D is about 0.35.

15. The assembly of claim 14, wherein:
the second reference plane is oriented at an oblique angle relative to the engine axis; and
the oblique angle is approximately 5 degrees.

16. The assembly of claim 3, further comprising:
an inner shaft concentric with an outer shaft;
wherein the inner shaft connects the fan and a low pressure compressor to the low pressure turbine such that the inner shaft drives the fan through the geared architecture; and
wherein the outer shaft interconnects a high pressure compressor to the high pressure turbine.

17. The assembly of claim 16, wherein the turbine section includes a mid-turbine frame between the high pressure turbine and the low pressure turbine.

18. The assembly of claim 17, wherein the mid-turbine frame includes a plurality of vanes in a core airflow path defined by the turbine section.

19. The assembly of claim 18, wherein:
the plurality of vanes are inlet guide vanes; and
the inlet guide vanes set airflow entering the low pressure turbine during operation.

20. The assembly of claim 19, wherein the mid-turbine frame supports bearing systems.

21. The assembly of claim 16, wherein the fan has a low corrected fan tip speed of less than 1150 ft/second.

22. The assembly of claim 21, wherein the dimensional relationship of L/D is between 0.30 and 0.40.

23. The assembly of claim 22, wherein the pressure ratio of the fan is less than 1.45 at the cruise design point.

24. The assembly of claim 1, wherein the dimensional relationship of L/D is between 0.2 and 0.45.

25. The assembly of claim 24, wherein the pressure ratio of the fan is less than 1.45 at the cruise design point.

26. The assembly of claim 25, wherein the fan has a low corrected fan tip speed of less than 1150 ft/second.

27. The assembly of claim 25, wherein:
the turbine section includes a mid-turbine frame between the high pressure turbine and the low pressure turbine;
the mid-turbine frame supports bearing systems; and
the mid-turbine frame includes a plurality of vanes in a core airflow path defined by the turbine section.

28. The assembly of claim 27, wherein the plurality of vanes are inlet guide vanes.

29. The assembly of claim 25, wherein the high pressure turbine includes two stages.

30. The assembly of claim 25, wherein the geared architecture defines a gear reduction ratio of greater than 2.3.

* * * * *